United States Patent
Huang et al.

(10) Patent No.: US 10,710,115 B2
(45) Date of Patent: Jul. 14, 2020

(54) LINEAR VIBRATION MOTOR

(71) Applicant: AAC Technologies Pte, Ltd., Singapore (SG)

(72) Inventors: Jinquan Huang, Shenzhen (CN); Hongfu Xu, Shenzhen (CN); Fanghua Ling, Shenzhen (CN); Junsheng Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 385 days.

(21) Appl. No.: 15/651,408

(22) Filed: Jul. 17, 2017

(65) Prior Publication Data

US 2018/0297067 A1    Oct. 18, 2018

(30) Foreign Application Priority Data

Apr. 14, 2017  (CN) ............ 2017 2 0396944 U

(51) Int. Cl.
| | |
|---|---|
| *B06B 1/04* | (2006.01) |
| *H02K 33/02* | (2006.01) |
| *H02K 33/00* | (2006.01) |
| *H02K 33/12* | (2006.01) |

(52) U.S. Cl.
CPC ............ *B06B 1/045* (2013.01); *H02K 33/02* (2013.01); *H02K 33/12* (2013.01)

(58) Field of Classification Search
CPC ......... B06B 1/045; B06B 1/04; H02K 33/00; H02K 33/02; H02K 33/12; H02K 35/00; H02K 35/02
See application file for complete search history.

(56) References Cited

U.S. PATENT DOCUMENTS

| | | | | |
|---|---|---|---|---|
| 7,355,305 | B2* | 4/2008 | Nakamura | H02K 33/06 310/12.03 |
| 7,999,421 | B2* | 8/2011 | Kim | H02K 33/18 310/15 |
| 8,258,657 | B2* | 9/2012 | Kim | H02K 15/02 310/28 |
| 8,278,786 | B2* | 10/2012 | Woo | H02K 33/16 310/15 |

(Continued)

FOREIGN PATENT DOCUMENTS

| | | | |
|---|---|---|---|
| CN | 105553219 A | * | 4/2016 |
| JP | 2002200460 A | * | 7/2002 |

*Primary Examiner* — Edgardo San Martin
(74) *Attorney, Agent, or Firm* — IPro, PLLC; Na Xu

(57) ABSTRACT

A linear vibration motor includes a base including an accommodation space; a vibration unit; and a first elastic unit suspending the vibration unit in the accommodation space. The first elastic unit includes two elastic pieces located on two opposite sides of the vibration unit, each the elastic piece having a main elastic arm, a first auxiliary elastic arm and a second auxiliary elastic arm extending reversely in a bending way respectively from an end of the first auxiliary elastic arm and an end of the second auxiliary elastic arm. The main elastic arm is perpendicular to the vibration direction, the first auxiliary elastic arm and the second auxiliary elastic arm are respectively located on the two opposite sides of the main elastic arm, the first fixed arm is fixed to the vibration unit, and the second fixed arm is fixed to the base.

6 Claims, 2 Drawing Sheets

(56) References Cited

U.S. PATENT DOCUMENTS

| | | | | |
|---|---|---|---|---|
| 8,643,229 B2* | 2/2014 | Park | .................. | H02K 33/16 |
| | | | | 310/15 |
| 8,829,741 B2* | 9/2014 | Park | .................. | B06B 1/045 |
| | | | | 310/25 |
| 9,748,827 B2* | 8/2017 | Dong | .................. | H02K 33/16 |
| 9,815,085 B2* | 11/2017 | Chun | .................. | H02K 33/16 |
| 2009/0096299 A1* | 4/2009 | Ota | .................. | B06B 1/045 |
| | | | | 310/25 |
| 2011/0006618 A1* | 1/2011 | Lee | .................. | B06B 1/045 |
| | | | | 310/25 |
| 2011/0101797 A1* | 5/2011 | Lee | .................. | H02K 33/16 |
| | | | | 310/29 |
| 2011/0169347 A1* | 7/2011 | Miyamoto | .............. | B06B 1/045 |
| | | | | 310/12.21 |
| 2011/0266892 A1* | 11/2011 | Wauke | .................. | B06B 1/045 |
| | | | | 310/25 |
| 2012/0153748 A1* | 6/2012 | Wauke | .................. | H02K 33/16 |
| | | | | 310/25 |
| 2017/0126109 A1* | 5/2017 | Hara | .................. | H02K 33/00 |
| 2018/0241293 A1* | 8/2018 | Miyazaki | .............. | H02K 33/16 |
| 2018/0278137 A1* | 9/2018 | Zhu | .................. | H02K 33/02 |
| 2018/0297069 A1* | 10/2018 | Hua | .................. | B06B 1/045 |
| 2019/0036435 A1* | 1/2019 | Zhu | .................. | H02K 33/06 |

\* cited by examiner

LINEAR VIBRATION MOTOR

FIELD OF THE PRESENT DISCLOSURE

The present disclosure relates to vibration motors, more particularly to a linear vibration motor having a vibration unit vibrating along a horizontal direction.

DESCRIPTION OF RELATED ART

With the development of electronic technologies, portable consumable electronic products are increasingly popular, such as mobile phone, handheld game console, navigating device or handheld multimedia entertainment equipment, in which a vibration motor is generally used for system feedback, such as call reminder, message reminder, navigation reminder of mobile phone, vibration feedback of game console. To meet the demand of such a wide application, the vibration motor shall have high performance and long life.

A linear vibration motor of related art comprises a base with an accommodation space, a vibration unit located in the accommodation space, elastic pieces respectively fixed on two sides of the vibration unit for suspending the vibration unit in the accommodation space, and a coil fixed at the base.

To increase the vibration power of the linear vibration motor, the elastic piece is a U-shape structure so as to increase the stroke length of the elastic piece.

However, in the linear vibration motor of related art, although two elastic pieces are provided symmetrically, the elastic piece of U-shape structure has a relatively high stroke tension, resulting in its limited vibration effect; in addition, although the above structure is provided so that the linear vibration motor makes X-axis (horizontal direction) vibration, a problem of big shake exists on Y-axis and Z-axis, which is detrimental to the reliability of the vibration motor.

Therefore it is necessary to provide an improved linear vibration motor for overcoming the above-mentioned disadvantages.

BRIEF DESCRIPTION OF THE DRAWING

Many aspects of the exemplary embodiment can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
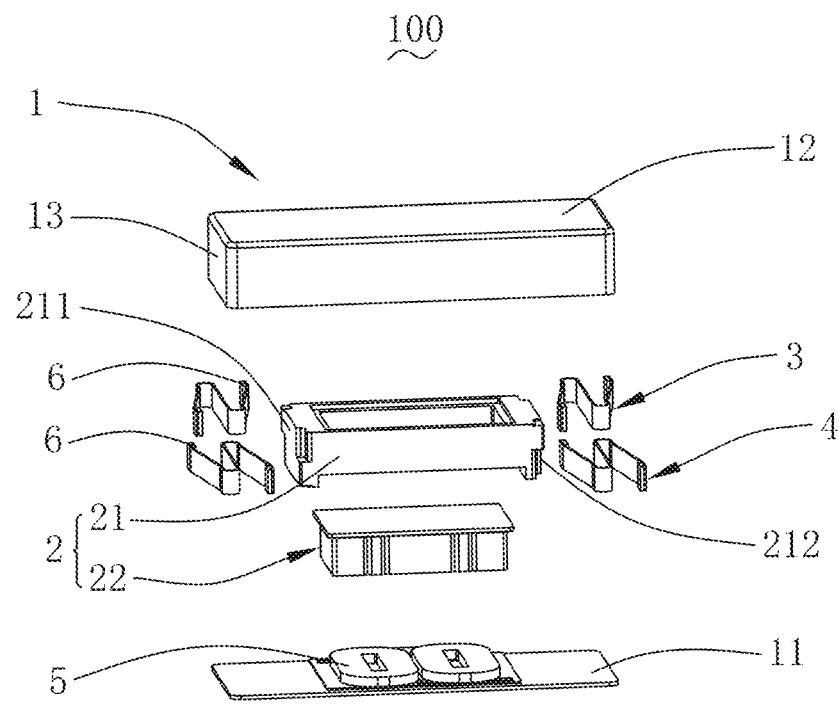
FIG. 1 is an exploded view of a linear vibration motor in accordance with an exemplary embodiment of the present disclosure.
Figure 2:
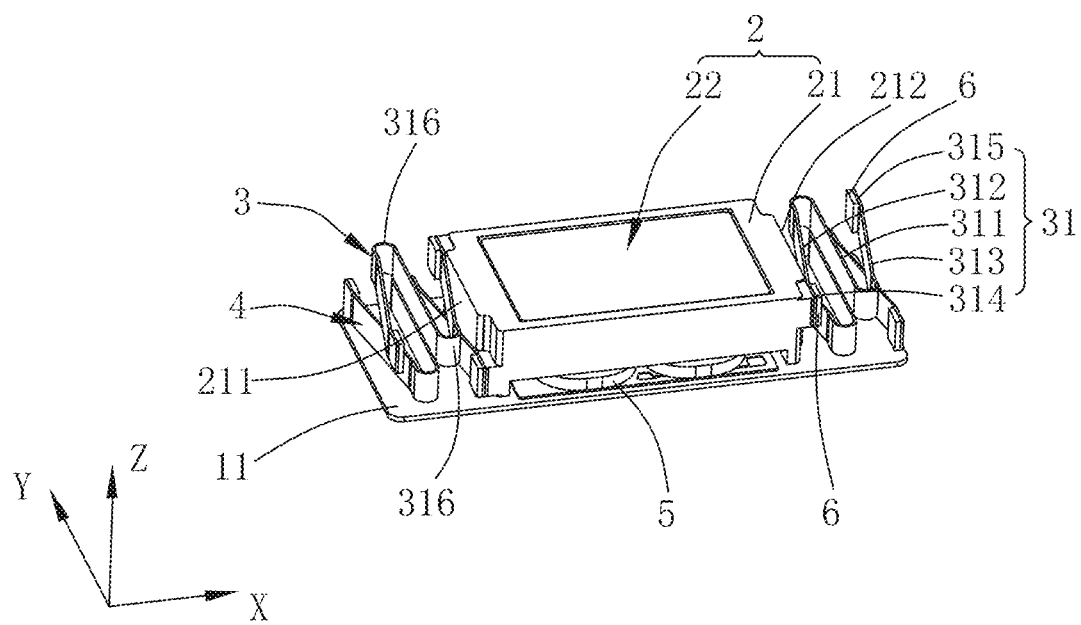
FIG. 2 is an isometric view of a part of the linear vibration motor in FIG. 1.
Figure 3:
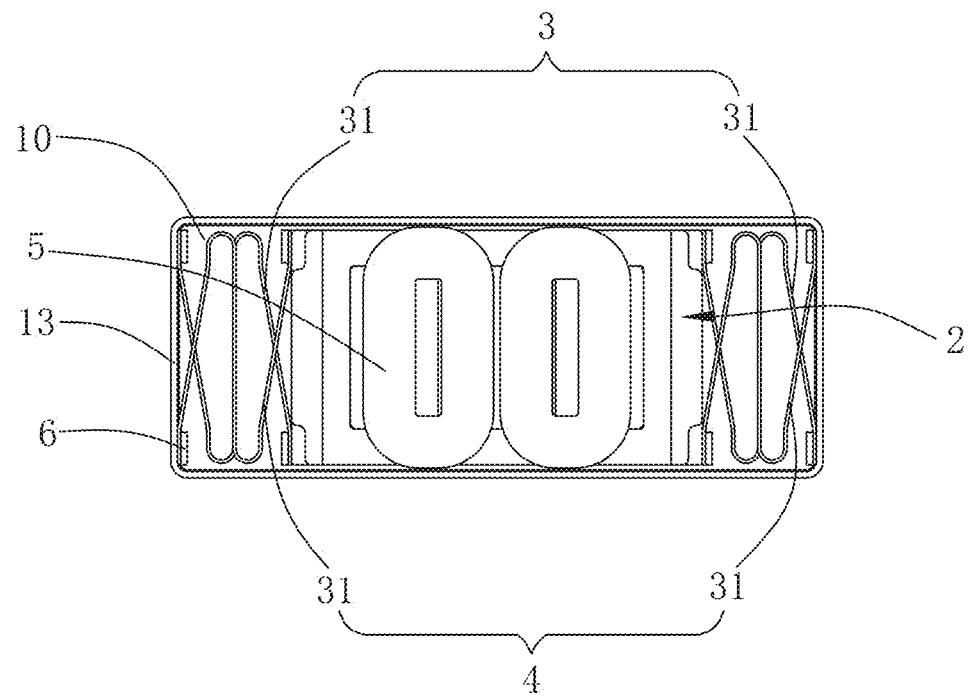
FIG. 3 is a top view of a part of the linear vibration motor in FIG. 1.
Figure 4:
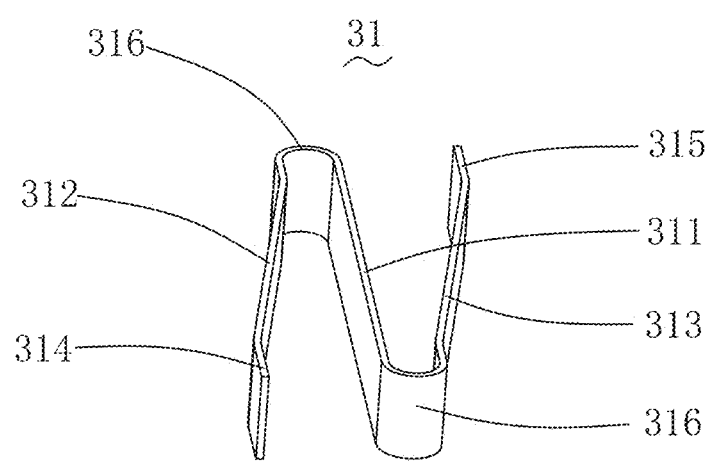
FIG. 4 is an isometric view of an elastic piece of the linear vibration motor.

Referring to FIGS. 1-4, the present disclosure provides a linear vibration motor 100. The linear vibration motor 100 comprises a base 1 with an accommodation space 10, a vibration unit 2, a first elastic unit 3 and a second elastic unit 4 fixing and suspending the vibration unit 2 in the accommodation space 10, and a coil 5 fixed to the base 1 and driving the vibration unit 2 to vibrate.

The base 1 comprises a bottom plate 11, a top plate 12 opposite to the bottom plate 11, and a side plate 13 connecting the bottom plate 11 to the top plate 12 for enclosing the accommodation space 10. In this embodiment, the base 1 is substantially a rectangular.

The vibration unit 2 comprises a weight 21 and a magnet 22 positioned by the weight 21. The vibration unit 2 comprises a first side wall 211 extending along a vibration direction (X-direction in FIG. 2) and a second side wall 212 opposed to the first side wall 211. The first side wall 211 and the second side wall 212 are located on two opposite sides of the weight 21.

The first elastic unit 3 comprises two elastic pieces 31 respectively located on two opposite sides of the vibration unit 2 along the vibration direction, preferably, the two elastic pieces 31 of the first elastic unit 3 are arranged to be central symmetrical with each other.

The second elastic unit 4 comprises two elastic pieces 31 respectively located on two opposite sides of the vibration unit 2 along the vibration direction, preferably, the two elastic pieces 31 of the second elastic unit 4 are arranged central symmetrically.

The first elastic unit 3 and the second elastic unit 4 are spaced from each other and form an overlapping assembly structure. Specifically, the two elastic pieces 31 are fixedly located between the first side wall 211 and the side plate 13, and the two elastic pieces 31 are arranged overlapped, spaced from each other to form an assembly structure of dual-layer elastic pieces mounted reversely. Another two elastic pieces 31 are fixedly provided between the second side wall 212 and the side plate 13, and the two elastic pieces 31 are overlapped and spaced from each other to form an assembly structure of dual-layer-elastic pieces mounted reversely. In this embodiment, the four elastic pieces 31 are taken as examples for specific description, all of the elastic pieces 31 are absolutely the same.

The elastic pieces 31 comprise a main elastic arm 311, a first auxiliary elastic arm 312 and a second auxiliary elastic arm 313 extending reversely in a bending way respectively from both ends of the main elastic arm 311, a first fixed arm 314 and a second fixed arm 315 extending in a bending way respectively from the end of the first auxiliary elastic arm 312 and the end of the second auxiliary elastic arm 313.

Wherein, the main elastic arm 311 is provided perpendicular to the vibration direction; the first auxiliary elastic arm 312 and the second auxiliary elastic arm 313 are respectively located on the opposite two sides of the main elastic arm 311; the first fixed arm 314 is fixed at the vibration unit 2, the second fixed arm 315 is fixed at the base 2, specifically fixed at the side plate 13 of the base 2.

With the above structure, the elastic piece 31 has a multi-retracing structure of N shape. Thereby the opening enclosed by bending the elastic piece 31 is relatively large, i.e. big stroke, low stroke stress while long service life, resulting in good performance of the linear vibration motor 100. Preferably, the elastic pieces 31 are a centrally symmetric structure, which gives higher stability of the vibration unit 2 in vibration.

In this embodiment, a curve section 316 in a round-corner shape is formed at both the bending connecting points of the first auxiliary elastic arm 312 and the main elastic arm 311 and the bending connecting point of the second auxiliary elastic arm 313 and the main elastic arm 311. The curve section 316 can increase the elastic intensity of the elastic pieces 31.

In this embodiment, the main elastic arm 311 of each of the elastic pieces 31 is provided perpendicular to the vibration direction (X-axis direction), thus making the main elastic arm 311 perpendicular to a compression direction of the elastic piece 31, thus effectively increase rigidity of the elastic piece 31 on the Y-axis direction and reduce shake of the operating vibration unit 2 on the Y-axis direction.

Preferably, the main elastic arm 311, the first fixed arm 314 and the second fixed arm 315 of each of the elastic pieces 31 are provided parallel to each other, to improve the stroke stress of the elastic piece 31.

The main elastic arm 311, the first auxiliary elastic arm 312 and the second auxiliary elastic arm 313 generate elastic deformation together to provide elastic resilience; the first fixed arm 314 is used to fix the vibration unit 2, the second fixed arm 315 is used to fix the base 1 (specifically the side plate 13), so as to fixing and suspending the vibration unit 2 in the accommodation space 10.

In this embodiment, the two elastic pieces 31 on the same side of the vibration unit 2 are assembled and provided reversely. That is, of the two elastic pieces located on the same side of the vibration unit 2, one opening enclosed by the main elastic arm 311 and the first auxiliary elastic arm 312 of one elastic piece 31, and the opening enclosed by the main elastic arm 311 and the first auxiliary elastic arm 312 of another elastic piece 31 are oriented oppositely. The structure effectively increases rigidity of the vibration unit 2 on the Y-axis and X-axis directions to prevent it to shift or shake toward the Y-axis direction and Z-axis direction, thus improving the reliability and stability of the linear vibration motor 100.

In this embodiment, the four elastic pieces 31 are provided to from a dual-layer central symmetric structure which can effectively reduce the vibration shift and shake of the vibration unit 2 toward the Y-axis direction of the linear vibration motor 10 in operation, thus increasing the stability of the linear vibration motor 10.

The coil 5 is fixedly mounted at the bottom plate 11, provided as facing and spaced from the magnet 22. In this embodiment, the coil 5 is a dual-coil structure.

Baffle plates 6 comprise at least eight in number, the baffle plates 6 are respectively fixed at the side close to the main elastic arm 311 of the first fixed arm 314 and the second fixed arm 315 of each of the elastic pieces 31, to reinforce each of the first fixed arm 314 and the second fixed arm 315 respectively and fix each at the vibration unit 2 and the side plate 13 of the base 1 respectively, thus preventing drop of the elastic piece 31 from the base 1 or from the vibration unit 2 to improve the reliability of the linear vibration motor 100.

Compared with related art, the linear vibration motor of the present utility model is provided with multiple elastic pieces which are respectively fixed on two opposite sides of the vibration unit along its vibration direction, the elastic piece has a N-shape structure with big stroke and low stress, thus improving its elastic performance and service life and provide good vibration performance of the linear vibration motor; the two elastic pieces on the same side are provided reversely to from a dual-layer structure mounted reversely, thus effectively increasing rigidity of the vibration motor on the Y-axis and Z-axis directions and prevent the vibration unit to shake toward the Y-axis direction in vibration; meanwhile, the multiple elastic pieces form a configuration of dual-layer central symmetric structure, reduce the vibration shift and shake toward the Y-axis direction of the vibration unit in operation, thus improving the reliability of the linear vibration motor.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor comprising:
a base including an accommodation space;
a vibration unit;
a first elastic unit suspending the vibration unit in the accommodation space, the first elastic unit comprising two elastic pieces located on two opposite sides of the vibration unit along a vibration direction, each of the elastic pieces having a centrally symmetric structure and comprising a main elastic arm, a first auxiliary elastic arm and a second auxiliary elastic arm extending reversely in a bending way respectively from two opposite ends of the main elastic arm, a first fixed arm extending in a bending way from an end of the first auxiliary elastic arm and a second fixed arm extending in a bending way from an end of the second auxiliary elastic arm; wherein
the main elastic arm is perpendicular to the vibration direction, the first auxiliary elastic arm and the second auxiliary elastic arm are respectively located on two opposite sides of the main elastic arm, the first fixed arm is fixed to the vibration unit, and the second fixed arm is fixed to the base.

2. The linear vibration motor as described in claim 1, wherein the main elastic arm, the first fixed arm and the second fixed arm of each elastic piece are parallel to each other.

3. The linear vibration motor as described in claim 1, wherein the two elastic pieces of the first elastic unit are arranged centrally symmetrical with each other.

4. The linear vibration motor as described in claim 1 further comprising a second elastic unit, wherein the second elastic unit comprises another two elastic pieces on two opposite sides of the vibration unit along the vibration direction, at the same side of the vibration unit, the elastic piece of the first elastic unit is overlapped and spaced from the elastic piece of the second elastic unit, and one opening enclosed by the main elastic arm and the first auxiliary elastic arm of the elastic piece of the first elastic unit is opposite to the other opening enclosed by the main elastic arm and the first auxiliary elastic arm of the elastic piece of the second elastic unit.

5. The linear vibration motor as described in claim 4, wherein the two elastic pieces of the second elastic unit are centrally symmetrical with each other.

6. The linear vibration motor as described in claim 4 further comprising a baffle plate fixed on one side of the first fixed arm and the second fixed arm close to the main elastic arms.

* * * * *